Aug. 16, 1949.　　　　J. M. WOLFSKILL　　　　2,479,286
PRODUCTION OF PIEZOELECTRIC CRYSTALS
Filed Nov. 21, 1944　　　　　　　　　　7 Sheets-Sheet 1

Inventor
John M. Wolfskill
By Bacon & Thomas
Attorneys

Inventor
John M. Wolfskill
By Bacon & Thomas
Attorneys

Aug. 16, 1949.  J. M. WOLFSKILL  2,479,286
PRODUCTION OF PIEZOELECTRIC CRYSTALS

Filed Nov. 21, 1944  7 Sheets-Sheet 3

Inventor
John M. Wolfskill
By Bacon & Thomas
Attorneys

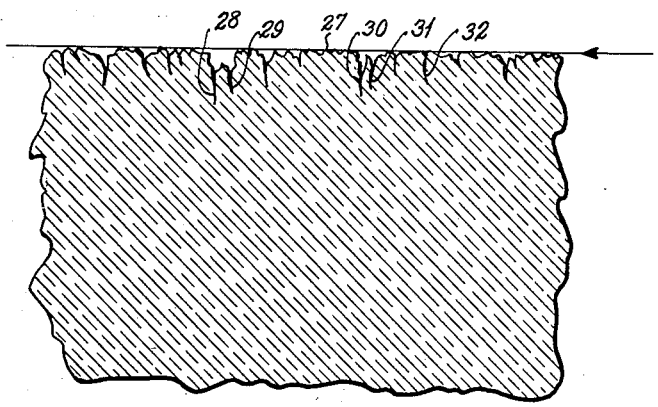
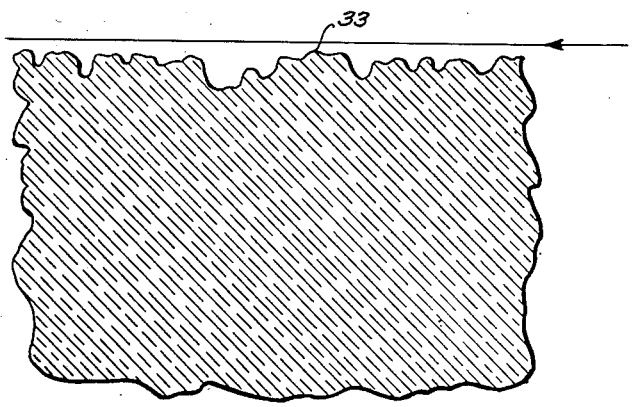

Fig. 8ª
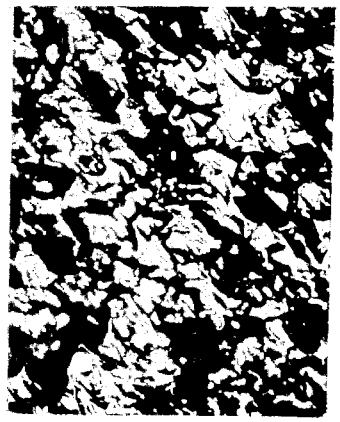
Fig. 8ᵈ
Fig. 8ᵇ
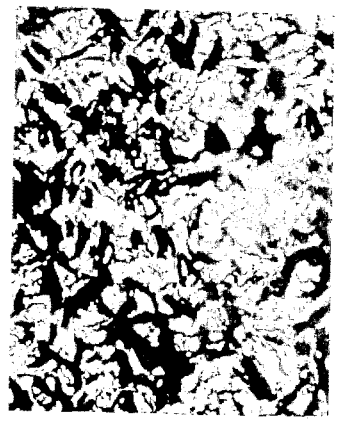
Fig. 8ᵉ
Fig. 8ᶜ
Inventor
John M. Wolfskill
By Bacon & Thomas
Attorneys Patented Aug. 16, 1949

2,479,286

UNITED STATES PATENT OFFICE 2,479,286

PRODUCTION OF PIEZOELECTRIC CRYSTALS

John M. Wolfskill, Erie, Pa., assignor to Bliley Electric Company, Erie, Pa., a corporation of Pennsylvania Application November 21, 1944, Serial No. 564,533

11 Claims. (Cl. 171—327)

This invention relates to the production of piezoelectric crystals and more particularly to a method of producing highly active piezoelectric crystals of precise frequency characteristics and having high stability.

In general, the present invention is concerned with reducing the size or thickness of piezoelectric crystals by etching the same after a preliminary grinding or lapping operation so as to rapidly bring the crystals to a desired frequency while at the same time producing crystals having high activity, which is substantially constant over an extended temperature range, and increased stability against change in frequency upon aging. The etching of such crystals has been suggested in the prior art. The results of such prior etching attempts were unpredictable and the crystals produced thereby were, in general, of low activity and unstable both as to change in frequency upon aging and as to sudden shifts in frequency during operation. The activity of such crystals also tended to vary unpredictably with change in temperature. The etching processes had been discarded and the commercial art continued to produce crystals by hand lapping of individual crystals to the desired final frequency. As is well known, this required extremely skilled workmen and was laborious and time consuming even for experienced operators, since repeated frequency tests were required on each individual crystal during the lapping operation, each test involving washing and drying the crystal followed by testing of the crystal in a test oscillator circuit. Such crystals, in general, had good activity if properly edge ground to restore activity after hand lapping, but were inferior to the crystals produced by the present invention in stability. However, large numbers of crystal blanks were irreparably damaged by errors in hand lapping resulting in substantial wastage even by skilled operators and this was particularly true for crystals requiring special contours for ultra high frequency purposes or for special crystals requiring extremely flat parallel surfaces, for example tolerances of twenty millionths of an inch over their entire surfaces. Nevertheless, the art continued to employ the laborious hand lapping operations for bringing crystals to their final frequency.

In accordance with the present invention, it has been found that proper control of an etching process, including concentration of the etching step and the extent of etching, enables crystals to be produced, which are very much superior, particularly with respect to aging, to those produced by hand lapping operations. Furthermore, the time and labor required for bringing an individual crystal to final frequency is far less than that required by a hand lapping operation and groups of similar crystals can be treated simultaneously so that crystals can be turned out in batches rather than individually. Large numbers of improved crystals are now being commercially produced by the process of the present invention and wastage of crystal blanks has been substantially eliminated. When a crystal blank has been brought to a desired contour or the surfaces rendered parallel and flat, these characteristics are maintained during etching.

It is therefore an object of the invention to provide an improved method of producing piezoelectric crystals in which the crystals are etched to final frequency.

Another object of the invention is to provide an improved process of etching piezoelectric crystals to final frequency in which the concentration of the etching solution is held within certain limits.

Another object of the invention is to provide an improved process of etching piezoelectric crystals to final frequency in which the crystals are properly conditioned for the etching operation.

Another object of the invention is to provide an improved method of bringing piezoelectric crystals to final frequency in which the crystals are etched at least a predetermined minimum extent in an etching solution of suitable concentration.

Another object of the invention is to provide a method of etching piezoelectric crystals to final frequency in which crystals of improved stability over those made by hand lapping operations are produced.

Another object of the invention is to provide an improved process of bringing crystals to final frequency in which an etching operation can be controlled with sufficient precision that a plurality of crystals may be treated simultaneously.

A further object of the invention is to provide a process of bringing piezoelectric crystals to final frequency in which the resulting crystals have high activity, precise frequency characteristics and high resistance to aging.

A still further object of the invention is to provide an improved process of producing metal plated crystals.

Other objects and advantages of the invention will appear in the following description thereof given in connection with the attached drawings, in which:

Figure 6 is a diagrammatic view of surface characteristics of a crystal produced by lapping;

Figure 7 is a view similar to Figure 6 showing surface characteristics of a crystal produced in accordance with the present invention;

Figure 9:
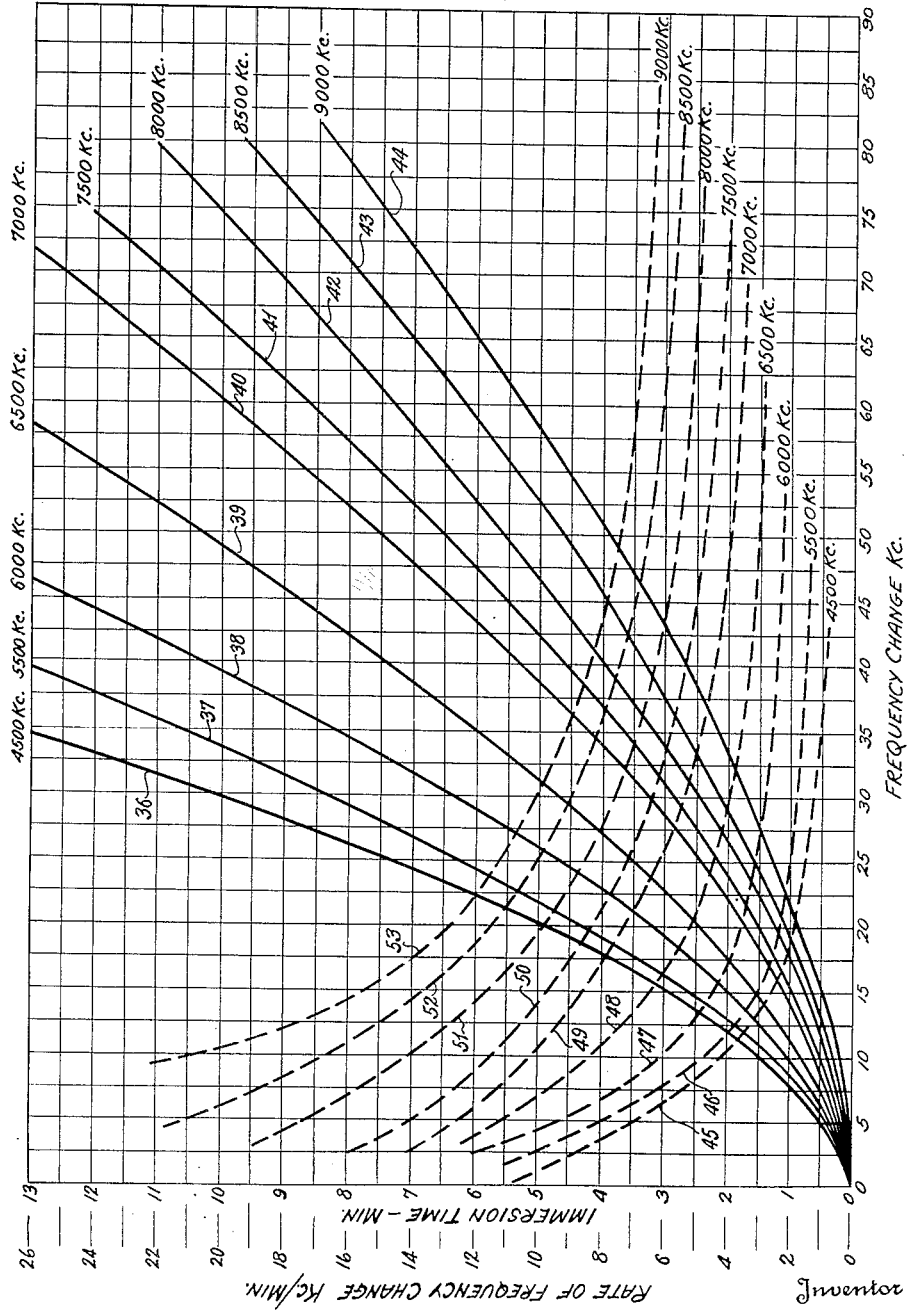
Figure 10:
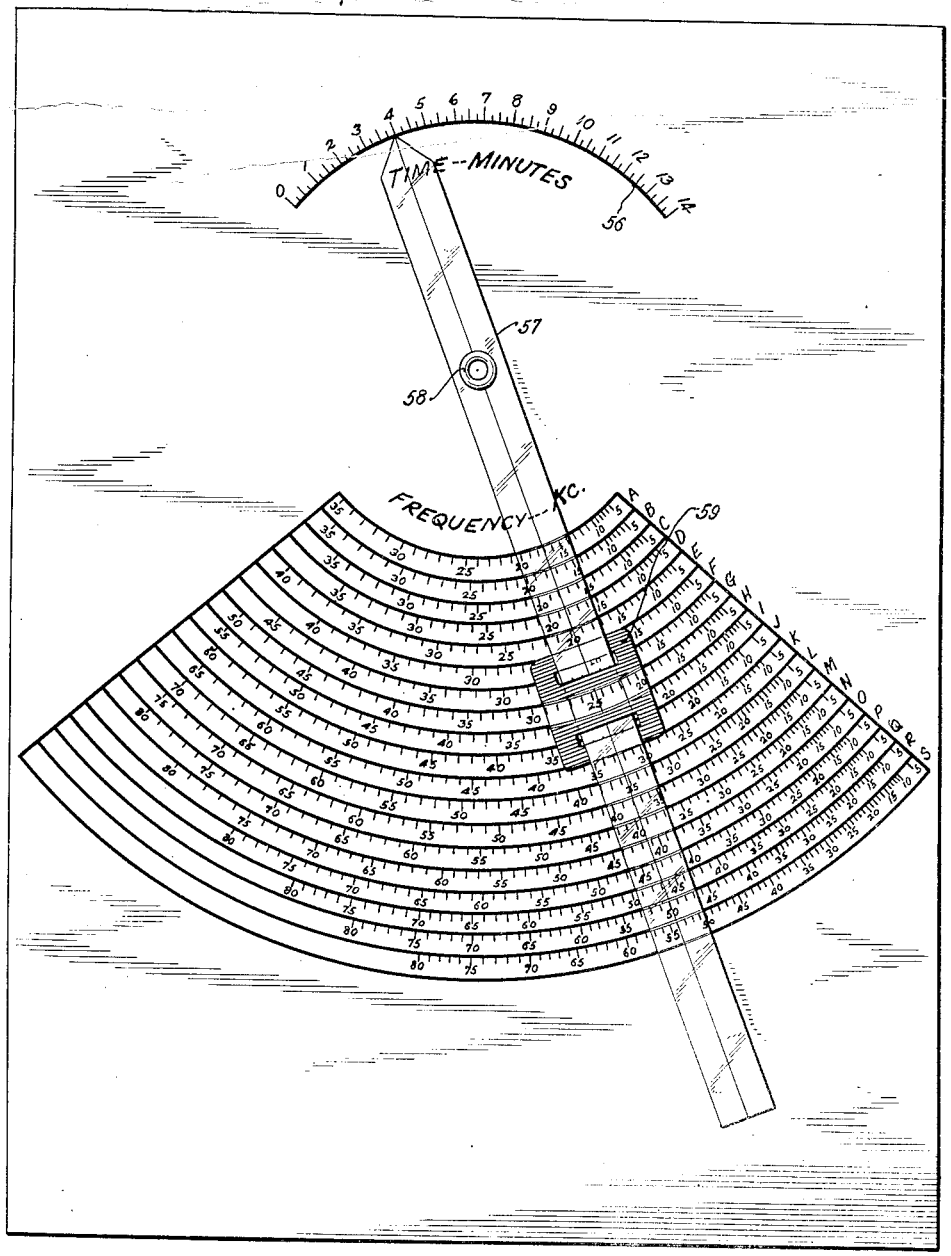

Figures 8a to 8e inclusive are microphotographs showing the surface characteristics of quartz crystals etched for the same length of time in hydrofluoric acid solutions of different concentrations;

Figure 9 is a graph showing frequency changes of crystals as a function of immersion time for B-cut crystals in a solution of definite concentration and also frequency change as a function of rate of frequency change in the same solution; and Figure 10 is a diagrammatic representation of an arcuate slide rule correlating the details of a plurality of graphs, such as that shown in Figure 7, and useful in controlling the process of the present invention.

Among the more important considerations in bringing piezoelectric quartz crystals to final frequency by etching to produce crystals of high activity, high stability and precise frequency characteristics are the concentration of the etching solution employed and the time of etching, the latter factor including both the determination of the required time of etching to produce a desired frequency and the removal of a predetermined minimum amount of material to produce a crystal having high stability. Another factor is, however, the proper preparation or conditioning of the crystals for the etching operation. Thus, the method of the present invention, in general, includes a final lapping with an extremely fine grit, usually by precise lapping machines to produce accurately parallel surfaces. The fine grit removes surface scratches due to the use of coarser grit in preliminary grinding operations. Sufficient excess material is left on the crystal to enable a definite minimum amount of this material to be removed by etching so as to produce a crystal of high stability. Etching is then carried out for a controlled time in hydrofluoric acid or equivalent solution of proper concentration for a determined time to bring the crystal to the desired final frequency. In the case of plate crystals, the etching may be followed by edge grinding of the crystal to restore any activity lost during the etching operation.

Figure 1:
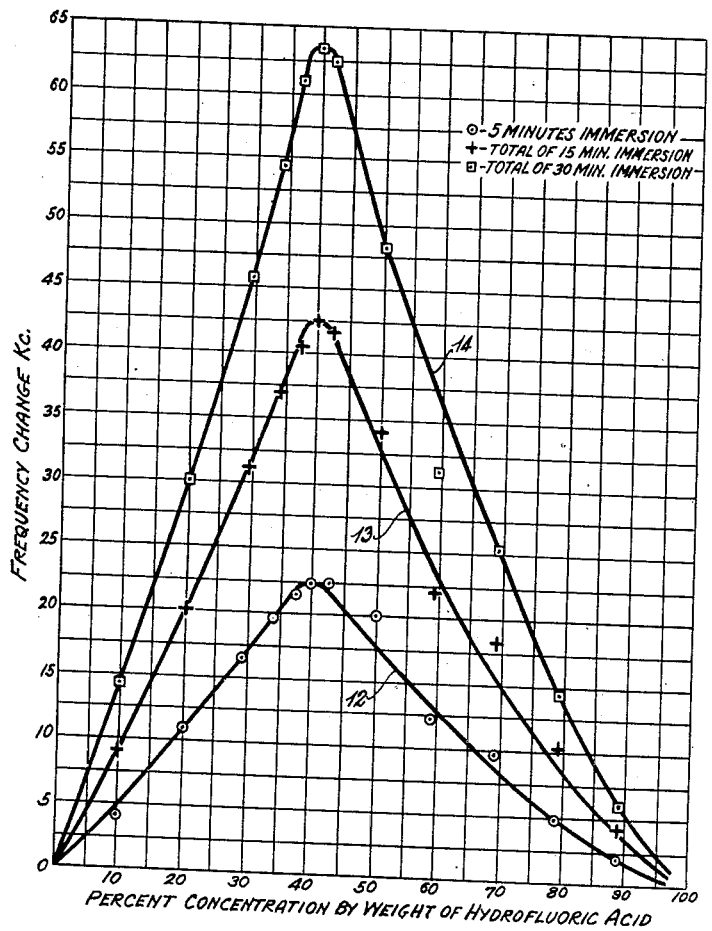
Figure 1 is a graph illustrating the etching rate for various concentrations of hydrofluoric acid.

The curves of Figure 1 show that the rate of etching is a function of the concentration of the solution and that the greatest etching rate occurs at approximately 40% by weight concentration of hydrofluoric acid in water. In these curves, the frequency change in kilocycles for a selected group of crystals has been plotted against percent concentration by weight of hydrofluoric acid for three different periods of immersion of the crystals, the solution being at normal room temperatures. The particular crystals selected for this determination were A-cut crystals having an initial frequency of approximately 3600 kc. The crystals were first lapped to approximately this frequency on a finish lapping machine using a fine grit and the edges then ground for maximum activity. Curves 12, 13 and 14 for immersion times of 5 minutes, 15 minutes and 30 minutes, respectively, all peak very close to 40% concentration, clearly illustrating that the rate of etching and resulting change in frequency of the crystal was a maximum for that concentration. The curves further show that for concentrations either greater or less than 40%, the rate of etching, that is, the frequency change of the crystals, rapidly decreases. Although the values of frequency change will be different for crystals having other initial frequencies or having a different cut, for example, B-cut crystals, the form of the curves is similar and the curves peak at approximately 40% concentration. The rate of etching will also vary with the temperature of the solution so as to increase with higher temperatures and decrease with lower temperatures but the form of the curves remain the same and they still peak at approximately 40% concentration. As discussed below, 40% concentration as well as concentrations less than 40% produce the highest quality crystals, while concentrations as high as 60% tend to impair the quality of the crystals, particularly if a relatively large change in frequency is produced by etching.

Figure 2A:
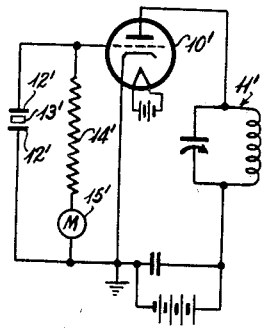
Figure 2a is a schematic diagram of a test oscillator circuit of a type suitable for obtaining data for the curves of Figure 2.
Figure 2:
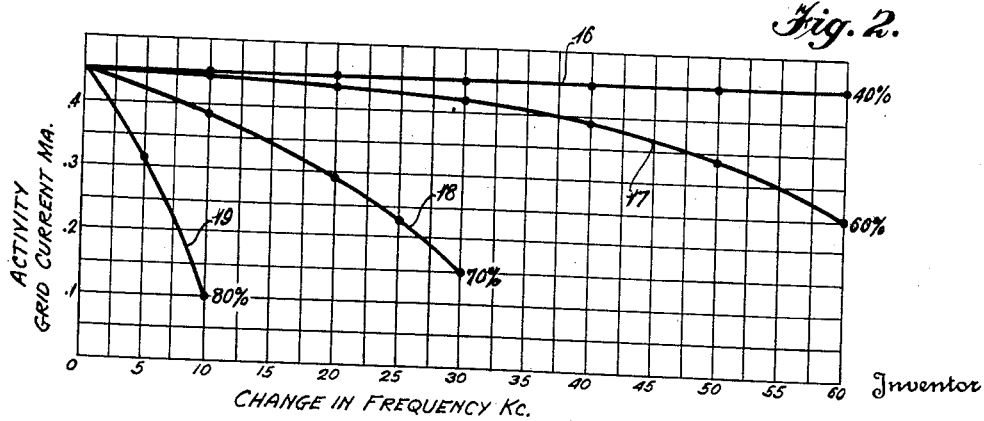
Figure 2 is a graph illustrating activity change for various extents of etching with hydrofluoric acid solutions of different concentrations.

It has been found that concentrations substantially above 40% tend to impair the activity of the crystal and the curves of Figure 2 illustrate this factor. The term "activity" is well understood in the piezoelectric crystal art. It may be defined as the reciprocal of the decrement or the Q of the crystal, the Q of the crystal being the ratio of inductive reactance to resistance in the equivalent electric circuit of the crystal. In actual practice, the activity is treated as a comparative factor in which the activity is considered to be proportional to the grid current reading of a standard oscillator in which the crystal is employed as a frequency control member. A suitable oscillator circuit is shown in Figures 2a and includes a triode or equivalent vacuum tube 10', a calibrated parallel tuned circuit 11' in the anode circuit of the tube, a pair of electrodes 12' for a crystal 13' in the grid circuit and a grid resistor 14' and milliammeter 15' in series between the grid and cathode as well as suitable sources of electric voltage. The grid current in milliamperes is taken as a measure of the activity of a particular crystal. Direct comparisons can thus be made between the activities of various crystals.

In the curves of Figure 2, the grid current of a standard oscillator is plotted against the change in frequency of the crystals when etched in solutions of varying concentrations, the tests being made at room temperature. It will be noted that in curve 16, for 40% concentrations, the activity remains substantially constant even for large changes in frequency, whereas curves 17, 18 and 19 for concentrations of 60, 70 and 80% respectively show a decrease in activity. For concentrations below 40% there is no substantial decrease in activity. In other words, below 40% concentration, the curves follow substantially the same line as the 40% curve of Fig. 2.

When the frequency of a plate type of crystal is changed materially either by hand lapping or etching, it is necessary to establish new edge dimensions to bring the crystal back to maximum activity. In preparing the curves of Figure 2, in each case an A-cut plate crystal was edge ground prior to etching to bring it to maximum activity and again edge ground after etching to bring it back to the highest activity obtainable. It has been found that for concentrations as high as 60% the original maximum activity can be substantially completely restored for relatively small changes in frequency but that there is a serious loss in activity for relatively large changes in frequency. For concentrations substantially above 60%, there is a permanent reduction of activity immediately upon immersing the crystal in the etching solution and the original activity can not be restored by edge grinding. Thus, the upper limit of concentration which can thus be employed to produce crystals of high activity is approximately 60% and even this concentration can only be employed for relatively small changes in frequency. Activity is not reduced for concentrations of 40% or below but concentrations much below 10% change the frequency of the crystal so slowly that they are not of practical use. The usable range of concentrations is, therefore, between 10 and 60% with the optimum range being between approximately 30 and 50%, the best concentration for rapid etching being 40%. It is sometimes desirable to employ a relatively low etching rate when small changes in frequency relative to the initial frequency of the crystal are required. Excellent results can be obtained throughout the range from 10 to 50% concentration and the concentration can be increased up to approximately 60% for relatively small changes in frequency although there is no practical advantage in so doing as concentrations below 40%, for example a concentration of approximately 23%, can be employed to give the same rate of etching as 60% concentrations without limitation as to extent of frequency change.

Figure 3:
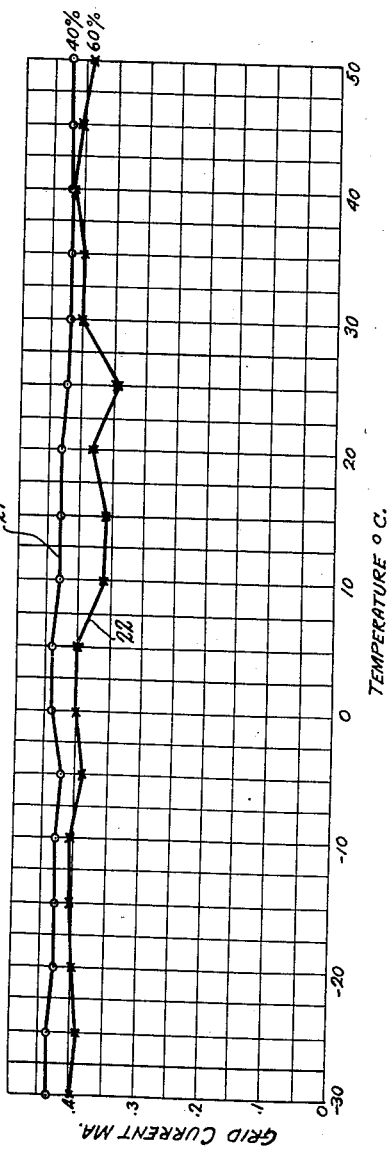
Figure 3 is a graph showing variations in activity of crystals over a temperature range when etched with solutions of hydrofluoric acid having different concentrations.
Figure 4:
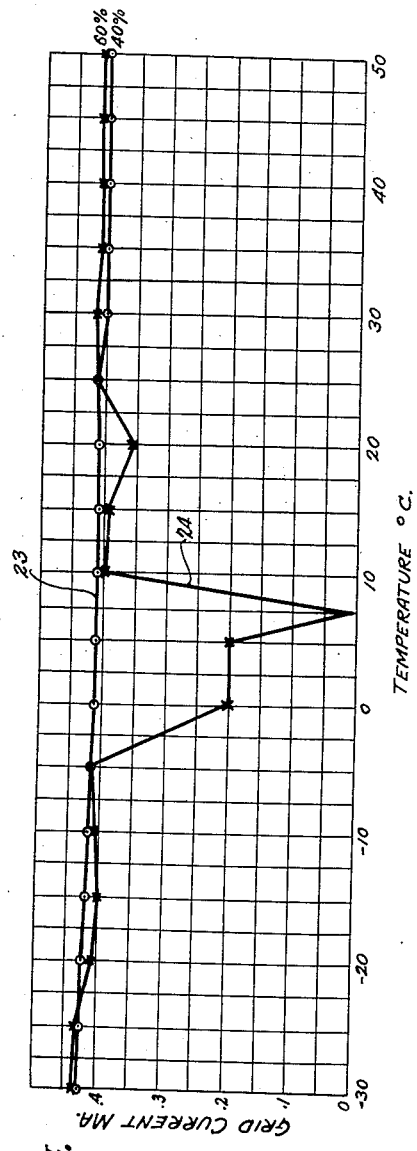
Figure 4 is a view similar to Figure 3 showing the results obtained with another set of crystals.

There is still another factor showing that concentrations of 50% or below produced the best quality crystals. Crystals are frequently required to operate over a considerable temperature range and it has been found that the activity of crystals etched in concentrations of hydrofluoric acid below 50% maintain their activity substantially at the maximum point throughout a wide temperature range, whereas concentrations much above 50% produce crystals which are erratic as to activity as the temperature is varied. The curves of Figures 3 and 4 are illustrative. For example, the curve 21 of Figure 3 shows the activity of a crystal etched in a 40% hydrofluoric acid solution as a function of temperature and it is to be noted that the activity is substantially constant over a range of temperatures from −30° C. to 50° C. A curve of an exactly similar crystal etched in 60% hydrofluoric acid is shown at 22. It will be noted that there was considerable variation of the activity of this crystal, particularly between 5° and 30° C. The curves of Figure 4, also showing the temperature activity characteristics of another set of crystals, illustrate an even greater variation in activity for a crysal etched in 60% hydrofluoric acid. Thus, the curve 23 of Figure 4 for the crystal etched in 40% hydrofluoric acid shows substantially constant activity over the entire temperature range while the curve 24 of a crystal etched in 60% hydrofluoric acid shows extremely erratic activity between temperatures ranging from −5° to +25° C., the activity dropping to substantially zero at approximately 7.5° C. With higher concentrations, even more erratic temperature-activity curves are produced and while crystals etched in 60% solutions are, in general, usable over restrictive temperature ranges, this is not true of crystals etched in more highly concentrated solutions. In general, the activity of crystals etched in solutions having a concentration below 40% as well as concentrations up to approximately 50% will produce temperature-activity curves similar to the curves 21 and 23 of Figures 3 and 4. That is to say, their activity remains substantially constant under wide variations in temperature. While the curves of Figs. 2 to 4 inclusive were derived from A-cut crystals having an initial frequency of approximately 3600 kc., crystals having other initial frequencies or differently cut, exhibit similar characteristics.

In producing high quality crystals, other factors must also be taken into consideration. For example, the surface finish of the crystal prior to etching is of importance. Crystals are conventionally rough lapped to approximate form in lapping machines employing relatively coarse grit in order to remove material at a relatively rapid rate. In order to produce consistent results, it is necessary that the final lapping prior to etching be carried out with an extremely fine grit. This can be accomplished in precision lapping machines which grind a plurality of crystals to dimensions suitable for etching to final frequency and provide accurately parallel surfaces on the crystals. Thus, for crystals up to 4 megacycles, the final grit should not be coarser than 500 mesh; for crystals between 4 and 6 megacycles, the final grit should not be coarser than 800 mesh; for crystals above 6 megacycles up to approximately 10 megacycles, the final grit should not be coarser than approximately 1000 mesh; and for crystals above 10 megacycles, the final grit should not be coarser than 1200 mesh. Sufficient material must be removed in the final lapping operation to substantially completely remove the scratches produced by the coarser grit in the rough grind operations. Thus, the depth of the final fine lapping operation should be between approximately 0.0005 and 0.0010 inch. Unless the final grinding is carried out with extremely fine grit with the removal of sufficient material to eliminate substantially all of the coarse scratches, the activity of the crystals may be impaired. Also, crystals capable of oscillating at two different frequencies relatively close to each other are likely to be produced so that the crystal is subject to sudden and unpredictable changes in frequency. For very high frequency crystals, higher activities are obtained by a series of alternate lapping and etching operations, the lapping being done with a very fine abrasive and the final operation being an etching operation. This provides a surface which is even freer from cracks and crevices and, therefore, results in good activity in very high frequency crystals.

Figure 5:
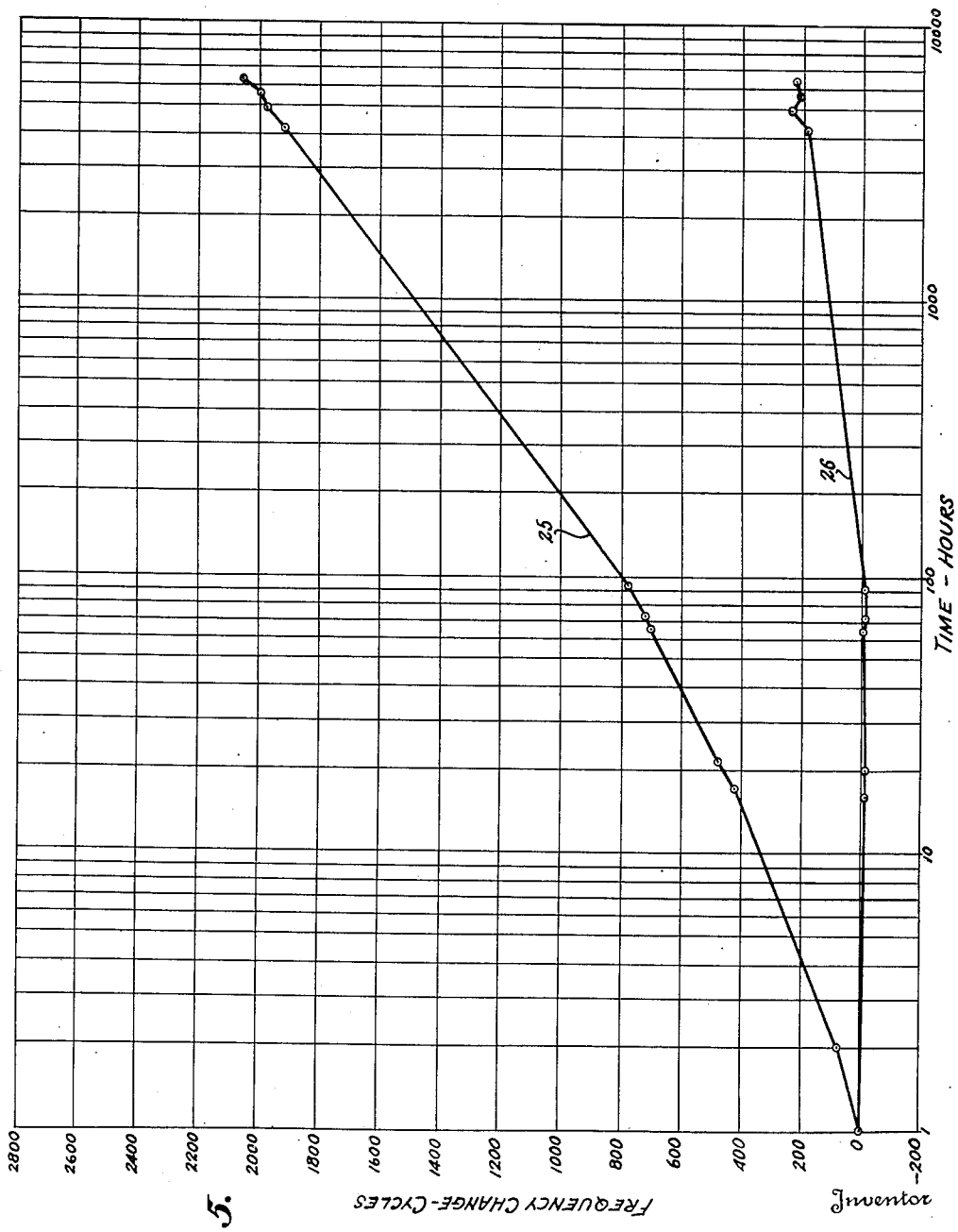
Figure 5 is a graph showing the improvement in resistance to aging of crystals produced in accordance with the present invention over crystals produced by lapping operations.

Another important factor is the depth of the etching operation, i. e., the amount of material removed by the etching operation. Crystals which have been brought to final frequency by hand lapping operations change their frequency rapidly with time and are thus deficient in stability. It has been found, however, that a properly prepared crystal, etched to final frequency, is markedly more stable than crystals finished by lapping. The curves of Fig. 5 are illustrative. In these curves, frequency change in cycles has been plotted against time in hours, the time being plotted on a logarithmic scale. Curve 25 of Fig. 5 was derived from data obtained from an 8 megacycle crystal finish lapped with 1000 abrasive but not etched. It will be noted that the frequency rapidly increases with time and that a change of over 2000 cycles occurred in approximately 6400 hours. A similar crystal after being finished lapped with 1000 abrasive was then etched sufficiently to change its frequency by 16 kc. It will be noted from the curve 26 of Fig. 6 that very little change in frequency occurred up to approximately 100 hours and that the change in frequency was only slightly more than 200 cycles in 6400 hours. The curves of Fig. 5 represent aging of crystals at room temperature and humidity conditions but accelerated tests can be made by subjecting the crystals to higher temperatures, for example 60 to 70° C. with humidity of 95 to 100%. Similar curves with a shortened time axis are obtained.

In order to obtain high stability against aging, it has been found that the amount of material removed should be at least sufficient to increase the frequency by approximately 0.05% of the initial frequency and that an increase in stability is obtained up to approximately 0.2% increase in frequency. In other words, the finish lapping operation should not bring the crystal closer than approximately 0.05% of its final frequency and preferably not closer than 0.2% of its final frequency, the remaining material being removed by etching. Greater amounts than 0.2% can be removed while still retaining high stability against aging.

Figures 6 and 7 are believed to present an explanation of the increased stability caused by sufficient etching and by proper preparation of the crystal prior to etching. Even with the finest grit obtainable, the surface of a crystal after lapping is somewhat similar to that shown at 27 in Figure 6. The diagrammatic sketch of this figure is upon an extremely large scale and illustrates the fact that the surface of the lapped crystal is covered with a plurality of minute cracks, such as the cracks 28, 29, 30, 31 and 32. Mechanical oscillation of the crystal, as well as temperature strains and capillary forces due to moisture penetrating the cracks, etc., progressively enlarge and deepen such cracks, reducing the effective thickness of the crystal. It can easily be understood that such cracks 30 and 31, for example, can actually join and allow separation of a particle of the crystal from the body thereof. In fact, it has been noted that crystals finished by lapping and carefully cleaned are frequently covered with very fine quartz dust after being stored.

The etching process produces a surface somewhat as shown at 33 in Figure 7. The surface cracks have been rounded out and sharp corners are substantially absent. No substantial deepening of the rounded depression or the breaking away of particles of the crystal occurs upon aging. However, the crystal must be properly prepared by fine grinding to remove large surface cracks prior to etching or otherwise deep crevices will be produced by the etching operation resulting in loss of activity and spurious responses at a plurality of frequencies. Concentrations of hydrofluoric acid of 50% or less tend to produce the type of surface shown in Figure 7, whereas higher concentrations produce a more irregular surface. This is substantiated by the microphotographs forming Figures 8a to 8e, inclusive. These microphotographs have been selected from a large number which have been taken of crystal surfaces after etching operations, in each the crystal having been previously lapped with a fine grit. The particular photographs selected show the result of etching a properly prepared crystal surface for 30 minutes with varying concentrations of hydrofluoric acid solutions. Thus, the photograph of Figure 8a shows a crystal etched with 20% hydrofluoric acid; the photograph of Figure 8b shows a crystal etched with 30% hydrofluoric acid; the photograph of Figure 8c shows a crystal etched with 40% hydrofluoric acid; the photograph of Figure 8d shows a crystal etched with 50% hydrofluoric acid; and the photograph of Figure 8e shows a crystal etched with 60% hydrofluoric acid. It is apparent from these microphotographs, all of which were taken at 1800 diameters, that the 40% hydrofluoric acid was the most effective in smoothing the surface. Even the 20 and 30% concentrations show a tendency to smooth out the surface over that of the higher concentrations such as the 60% concentration. In general, crystals in commercial production will not be etched in 40% hydrofluoric acid for 30 minutes but will be etched for periods ranging up to 15 minutes in 40% concentrations or less, the usual etching periods being less than 4 minutes. Such crystals will provide a surface very similar to that shown in Figure 8a, it apparently not being necessary to produce a surface approaching the smoothness of that of Figure 8c. It is believed that the important factor is the rounding out of the surface cracks so that further development of such cracks and splitting off of quartz particles is prevented. This apparently does not occur when concentrations much above 60% hydrofluoric acid concentration are employed.

Ths curves of Figure 9 are extremely useful in controlling the etching process in accordance with the present invention. These are merely representative curves and were platted for B-cut crystals etched in a 39.9% hydrofluoric acid solution by weight. A similar set of curves can be plotted for other concentrations and types of crystals and will be similar in shape but will differ as to actual values. The curves 36 to 44, inclusive, are for crystals lapped to the initial frequency noted with respect to the various curves. These curves show immersion time in minutes plotted against frequency change in kilocycles. It will be noted that the frequency change is not a linear function of immersion time. By employing these curves, it is possible to obtain the required immersion time in the solution of the concentration given for any desired change in frequency.

The curves 45 to 53, inclusive, show rate of frequency change in kilocycles per minute plotted against frequency change in kilocycles and were obtained by plotting the slopes of the respective curves 36 to 44. The curves 45 to 53, inclusive, are useful in determining the amount of additional immersing time necessary to further change the frequency of a crystal which has been partially etched. It will be apparent that the curves of this figure hold for one solution concentration only, but that a similar series of curves can be plotted for any concentration.

It has been found, however, that there is some variation with different crystals depending upon the precise procedure employed in finish lapping crystals. Thus, the curves of Figure 9 were all prepared from a single batch of crystals lapped under identical conditions. With other batches of crystals in which the finish lapping has been carried on for a greater length of time so that the grit size became smaller with time or with a different size grit, a small but significant shift in curves such as shown in Figure 9 will frequently occur. Even the nature of the carrier for the grit, i. e. whether it is oil or water or an aqueous soap solution, has an effect upon the results obtained. This shift in values may amount to as much as 5%.

Figure 10 illustrates an arcuate slide rule which has been developed to take care of all of the variables which occur in etching crystals to final frequency, including differences in finish lapping operations, differences in concentrations of the etching solution, etc. This slide rule was prepared from test data on a large number of crystals finished under different conditions and etched in solutions of varying concentrations. It has been found that the curves 36 to 44 of Figure 9 or of similar curves are of the form $y=ax^2+bx+c$, where $y$ represents immersion time and $x$ is frequency change. The constants $a$, $b$ and $c$ vary with the concentration and temperature of the solution, the initial frequency of the lapped crystal and somewhat with the manner in which the crystal was finish lapped. By actually computing the constants from data obtained from a large number of crystals, a plurality of frequency scales A to S, inclusive, were calculated and plotted against the time scale 56, a pointer 57 pivoted at 58 and provided with a slider 59 being employed to interrelate the time scales 56 and the frequency scales A to S, inclusive.

In employing the slide rule of Figure 10, a sample crystal from a given group of crystals finished under identical conditions is arbitrarily selected. This crystal is immersed for a definite time, for example 3 minutes, in the etching solution to be employed for the group. Its natural frequency is determined in a standard oscillator both before and after etching and the frequency change noted. The pointer 57 is then moved to the time on the time scale 56 corresponding to the time of immersion of the sample crystal, for example, the 3 minutes given above. The slider 59 is then moved along the pointer 57 to the scale which provides a frequency change reading nearest to that corresponding to the change in frequency of the sample crystal as the result of etching for the predetermined time. This locates one of the scales A to S, inclusive, to be employed for that entire batch of crystals.

The natural frequencies of each of the various crystals in the group are then determined and the crystals sorted according to the frequency change required. If a given group of crystals require a 15 kc. change in frequency, the pointer 57 is then set on the 15 kc. graduation of the scale selected as above described. The immersion time necessary to produce this change in frequency can then be read directly from the time scale 56. The entire group of crystals can be simultaneously immersed in the etching solution in which the sample crystal was originally immersed and left there for the required time. Other groups of the batch of crystals, requiring different frequency changes, can be treated in an exactly similar manner by setting the pointer on the selected frequency scale to the desired change in frequency and reading the required time from the time scale 56. The slide rule illustrated has been found to be extremely accurate and to give precise results. It enables single crystals to be accurately etched and also groups of crystals to be etched simultaneously and if the finish lapping operations are carefully controlled on a production basis so that variations due to difference of the procedure are eliminated, selected crystals from a plurality of batches can be treated simultaneously so that large numbers of crystals can be etched at the same time. That is to say, if a plurality of batches from the finish lapping operations require the same frequency change scale, they can be treated together.

If it is desired to further increase the frequency of a partially etched crystal in the same etching solution, the particular scale selected for that crystal in the initial etching operation can be employed to determine the further immersion time required. Thus, if the frequency had been changed 15 kc. in the first etching operation, the immersion time for this first etching operation is either known or can be determined from the slide rule. If it is desired to additionally increase the frequency, for example by 5 kc., the pointer can be moved to 20 kc. on the same scale and the time read from the scale. The difference between the initial immersion time and the immersion time for 20 kc. on the selected scale is the additional immersion time required to increase the frequency by 5 kc., i. e. making a total frequency change of 20 kc. The slide rule shown in Figure 10 has a much greater range of frequencies and times than is usually required. In actual commercial operations, slide rules covering an immersion time of 4 minutes with correspondingly finer division of time and frequency are usually found adequate. The slide rules above described take into account all of the variables mentioned above and additionally also takes into account variations in temperature of the etching solution. That is to say, $$\Delta F = \frac{F^2 \Delta T}{K}$$

where $\Delta F$ is the frequency change, F is the frequency, $\Delta T$ is the change in thickness and K is the thickness coefficient. K varies with various cuts known to the art. For quartz crystals, the X-cut crystal has a thickness coefficient of $1.13 \times 10^5$; A or AT-cut crystals have a thickness coefficient of $.655 \times 10^5$; B or BT-cut crystals have a thickness coefficient of $.995 \times 10^5$; and C-cut crystals have a thickness coefficient of $1.97 \times 10^5$. The dimensions in the above equation are in inches and the frequency in cycles per second. Thus if $\Delta T$ were a linear function of time of immersion $\Delta F$ would vary linearly with $\Delta T$. However F would increase with time of immersion so that $\Delta T$ would increase with time of immersion. The data of the slide rule, however, clearly shows the contrary to be true indicating that the rate of removal of material from the crystal decreases as etching progresses.

The process of the present invention can also be controlled automatically for each batch of crystals of the same initial characteristics and requiring the same frequency change. Thus, a sample crystal from a selected group can be employed as a control, this crystal being intermittently tested for frequency change. This can be done by supporting all of the group of crystals in a container, immersing them in an etching solution of proper concentration and then intermittently withdrawing the crystals to enable testing of the control crystal. The sample crystal can be associated with but supported separately from the other crystals of the group so as to enable such testing to be carried out on the sample crystal. The complete operation includes sorting the lapped crystals into groups, as above described with reference to using the slide rule of Figure 10 and inserting them into the container. Thereafter a cycle operation is carried out including dipping the container into the etching solution, withdrawing the crystals after a predetermined period of time, dipping them for a short period into a neutralizing solution to arrest etching, drying and testing the control crystal for frequency, and repeating the cycle until the desired frequency is obtained as to the control crystal. Thus, for example, the apparatus of Figure 8 of my copending application, Serial No. 386,938, filed April 4, 1941, now Patent No. 2,364,501, granted December 5, 1944, can be employed by merely attaching a container for a plurality of crystals to the vertical plunger 82 of Figure 8 of said application so as to be spaced laterally from the test crystal supported in the grooved runners 81 shown in said Figure 8, although other forms of apparatus may be employed.

While the etching operations of the present invention have been described with reference to etching solutions of hydrofluoric acid, it is, of course, understood that any soluble fluoride which will provide hydrofluoric acid in solution for reaction with quartz can be employed. Ammonium bifluoride is an example of such a compound. In general, any soluble compound of hydrofluoric acid with a weak base such as ammonium fluoride or calcium fluoride will hydrolize to provide hydrofluoric acid and the addition of a strong acid such as hydrochloric will increase the hydrofluoric acid content. Even slightly soluble fluorides can be employed in conjunction with a strong mineral acid to provide hydrofluoric acid. The concentrations of hydrofluoric acid discussed above relate to the actual concentration of this acid by weight in water irrespective of whether the acid is added as such or produced in the solution by hydrolysis or other reactions.

When a given hydrofluoric acid solution is employed for etching over a considerable period of time, or when a number of large batches of crystals are successively etched, the solution becomes progressively more dilute as the acid is consumed. This requires that the times of etching be correspondingly changed or that make-up acid be periodically introduced causing abrupt changes in concentration. It has been found that certain mixtures of hydrofluoric acid and ammonium bifluoride retain a substantially constant etching rate even though large numbers of crystals are etched therein. The ammonium bifluoride apparently releases hydrofluoric acid as hydrofluoric acid is used up. Thus, the addition of from 10 to 20% of ammonium bifluoride to a 35 to 40% solution of hydrofluoric acid does not materially change the etching rate thereof but merely maintains the strength of the solution. Additional ammonium bifluoride can be added from time to time to keep the concentration of ammonium bifluoride within the range mentioned.

Mixed vapors of hydrofluoric acid and water can also be employed for etching if care is exercised to maintain proper concentrations of the hydrofluoric acid in the vapors in contact with the crystal surfaces. Any known or suitable neutralizing solution, such as a solution of sodium bicarbonate, can be employed to arrest the etching operation after the desired time of contact with the etching medium.

The process of the present invention is also adaptable to the production of plated type crystals. In many cases crystals are employed in which the electrodes are plated directly upon the crystal surfaces instead of being positioned close to or merely in contact with opposite portions thereof. The etching operations of the present invention provide a relatively smooth and stable surface for receiving a metal coating as the depressions in the crystal surface are smooth and rounded allowing entrance of the metal thereinto. The metal interlocks with the surface of the crystal but the surface is sufficiently stable that temperature stresses, etc., do not cause separation of the metal from the crystal or separation of the crystal particles from the main body of the crystal, carrying the metal coating therewith. The metal coating can be applied in any suitable manner known to the art, such as by condensing vaporized metal upon the crystal in vacuum or sputtering metal upon the crystal.

In general, in making coated crystals, the crystal is etched to a higher frequency than that desired in the final crystal. After being carefully cleaned, the crystal is coated with metal in any suitable manner as above described. This coating may cover the entire surface of the crystal, if desired, as the edge portions of the crystal will ordinarily require surface grinding so that the metal is removed from the edge surfaces. The metal may be applied in just sufficient thickness to lower the frequency of the crystal to the desired final frequency. This type of process is, however, difficult to control and it is preferred to apply an excess thickness of the metal and then etch the excess metal from the crystal in an appropriate solution for the particular metal employed. For example, for silver coatings or aluminum, dilute nitric acid solutions are suitable. As is the case in removing the quartz surface from quartz crystals by etching, the frequency change produced by removing material increases in absolute value as the square of the frequency of the crystal. The K in the equation given above with respect to etching quartz is dependent upon both the density of the metal and the cut of the crystal when metal is being removed. It will be apparent that a series of curves such as that shown in Figure 9 may be determined for any given metal, cut of crystal and type of etching solution employed and concentration thereof. Furthermore, a slide rule such as that shown in Figure 10 may be prepared for any given metal, type of crystal cut and type of metal etching solution. Such a slide rule will take care of all the variables so long as the same type of crystal, same metal and same type of etching solution is employed. Also, the automatic method of employing a single crystal as a control, described above, can be employed for bringing plated crystals to final frequency. It is clear that the dissolving of metal to bring the crystal to final frequency can be employed with plated crystals even though such crystals were not etched prior to plating, although superior results are obtained when a crystal is etched the predetermined minimum amount above discussed prior to plating as described above, such etching carrying the crystal, for example 5000 cycles, above the desired frequency. After etching, the crystal can be plated to lower its frequency, for example 6000 cycles or 1000 cycles below the desired frequency. The metal can then be dissolved off with a suitable solution until the crystal is brought within close tolerances of the desired frequency or alternatively metal may be removed by an abrasive, for example, an abrasive cloth or even an ordinary eraser.

The above described method of etching piezoelectric crystals to the desired frequency from a lower frequency enables crystals to be brought to final frequency within extremely close tolerances with substantially no waste of previously lapped crystals. Plate type crystals are ordinarily ground upon lapping machines so that the faces of other surfaces of the crystal are very nearly exactly parallel and flat and these surfaces remain flat and parallel during the etching operation. It is known that large numbers of crystals are damaged in hand lapping operations even by skilled operators upon failure of the operator to keep the surfaces flat and parallel. Such crystals represent waste as they can only be restored by again processing in a lapping machine to a higher frequency. The method is also particularly applicable to crystals having special contours. Such special contoured crystals are employed for ultra high frequencies and require extreme care to produce the desired contour. In generaly, very high frequency crystals have better performance when one or both major surfaces are slightly convex. The amount of convexity will usually range between ten millionths and two hundred millonths of an inch. This contour is preferably established at a frequency lower than the desired frequency either by hand lapping or special lapping machines and the crystal then brought to final frequency by etching. It is extremely difficult to change the frequency of such crystals by hand lapping to bring them to the desired frequency while preserving the desired contour. The etching operation of the present invention preserves the contour of the crystal after it has been once produced thereon while changing the frequency so that the specially contoured crystals are much more efficiently produced by the present invention. Although the invention has been specifically described with reference to plate type crystals where the frequency characteristics are primarily dependent upon crystal thickness, it is apparent that the principals of the invention are equally applicable to bar type crystals as to which the frequency characteristics are primary dependent upon the length and width of the crystal.

This application is a continuation-in-part of my copending application, Serial No. 386,938, filed April 4, 1941 now Patent No. 2,364,501, granted December 5, 1941.

While I have disclosed the preferred embodiments of my invention, it is understood that the terms thereof may be varied within the scope of the following claims.

I claim:

1. The method of bringing quartz piezoelectric crystals accurately to desired frequency, which comprises, finish lapping said crystals to a frequency lower than the desired frequency, thereafter etching said crystals with a hydrofluoric acid solution having a concentration between approximately 10 and 60% by weight, and controlling the time of etching of said crystals with said solution to increase the frequency of said crystals by at least .05% and bring said crystals to said desired frequency.

2. The method of bringing quartz piezoelectric crystals accurately to the desired frequency, which comprises, finish lapping said crystals to a frequency lower than the desired frequency, thereafter etching said crystals with aqueous hydrofluoric acid having a concentration between approximately 30 and 50% by weight and controlling the time of etching of said crystals to increase the frequency of said crystals by at least .2% and bring said crystals to said desired frequency.

3. The method of producing quartz piezoelectric crystals having high stability against aging, high activity and precise frequency characteristics, which comprises, rough grinding said crystals to a frequency substantially lower than the desired frequency, thereafter finish lapping said crystals with a fine abrasive to an extent sufficient to remove substantially all of the scratches caused by said rough grinding while still leaving the crystal at a frequency lower than the desired frequency, and thereafter etching said crystals with aqueous hydrofluoric acid having a concentration between approximately 10 and 60% by weight, and controlling the time of etching of said crystals to increase the frequency of said crystal by at least .05% and bring said crystals to the desired frequency.

4. The method of producing plate type quartz piezoelectric crystals having high stability against aging, high activity and precise frequency characteristics, which comprises, rough grinding said crystals to a frequency substantially lower than the desired frequency, thereafter finish lapping the plate surfaces of said crystals with a fine abrasive to an extent sufficient to remove substantially all of the scratches caused by said rough grinding while still leaving the crystal at a frequency lower than the desired frequency, said finish lapping being sufficient to remove at least .0005 inch of material from said surface, and thereafter etching said crystals with aqueous hydrofluoric acid having a concentration between approximately 10 and 60% by weight, and controlling the time of etching of said crystals to increase the frequency of said crystals by at least .05% and bring said crystals to the desired frequency.

5. The method of producing quartz piezoelectric crystals having high stability against aging, high activity and precise frequency characteristics, which comprises, rough grinding said crystals to a frequency substantially lower than the desired frequency, thereafter finish lapping said crystals with a fine abrasive to an extent sufficient to remove substantially all of the scratches caused by said rough grinding while still leaving the crystal at a frequency lower than the desired frequency, and thereafter etching said crystals with aqueous hydrofluoric acid having a concentration between approximately 30 and 50% by weight, and controlling the time of etching of said crystals to increase the frequency of said crystal by at least .2% and bring said crystals to the desired frequency.

6. The method of producing quartz piezoelectric crystals having precise frequency characteristics, which comprises, finish lapping a plurality of piezoelectric crystals of the same type under substantially identical conditions to a frequency lower than that desired, sorting said crystals into groups depending upon the frequency change required for each crystal so that all of the crystals in a group require substantially the same frequency change, simultaneously etching all of said crystals in a given group with aqueous hydrofluoric acid having a concentration between approximately 10 and 60% by weight, and employing one of the crystals in said group as a control to determine the required time of etching for said group, said etching on each of said crystals being sufficient to change the frequency thereof by at least .05%.

7. The method of producing quartz piezoelectric crystals having precise frequency characteristics, which comprises, finish lapping a plurality of the same type of crystals under substantially identical conditions to a frequency lower than that desired, testing one of said crystals with an aqueous hydrofluoric acid having a concentration between approximately 10 and 60% to determine its frequency change with time of etching characteristics, sorting said other crystals into groups so that all of the crystals in the group require substantially the same frequency change to produce the desired frequency, predetermining the time of etching from said characteristics of said one crystal for each of said groups required to bring the crystals of the said groups to the desired frequency and simultaneously etching all of the crystals in a selected group in said etching medium for the predetermined time for said selected group, said etching on each of said crystals being sufficient to change the frequency thereof by at least .05%.

8. The method of producing quartz piezoelectric crystals having precise frequency characteristics, which comprises, finish lapping a plurality of the same type of crystals under substantially identical conditions to a frequency lower than that desired, sorting said crystals into groups depending upon the frequency change required so that all of the crystals in a given group require substantially the same time of etching with aqueous hydrofluoric acid having a concentration between 10 and 60% by weight to produce a desired frequency, simultaneously etching all of the crystals in a group with said aqueous hydrofluoric acid and employing one of the said crystals in said group as a control to determine the required time of etching for said group including intermittently testing said one crystal for frequency, said testing including withdrawing all of said crystals from contact with the etching medium, neutralizing the etching medium adhering to said crystals, washing and drying said one crystal and employing the same as a control element in a test oscillator and said etching on each of said crystals being sufficient to change the frequency thereof by at least .05%.

9. The method of producing quartz piezoelectric crystals having precise frequency characteristics, which comprises, finish lapping a plurality of the same type of crystals under substantially identical conditions to a frequency lower than that desired, testing one of said crystals with an aqueous hydrofluoric acid etching medium having a hydrofluoric acid concentration between approximately 10 and 60% to determine its frequency change with time of etching characteristics, predetermining from said characteristics of said one crystal the time of etching for the others of said plurality of crystals necessary to bring each of said crystals to the desired frequency, and etching each of said crystals in said medium for its associated predetermined time, said etching being sufficient to change the frequency of the crystal being etched by at least .05%.

10. The method of producing quartz piezoelectric crystals having precise frequency characteristics, which comprises, finish lapping a plurality of the same type of crystals under substantially identical conditions to a frequency lower than that desired, testing one of said crystals with an aqueous hydrofluoric acid etching medium having a hydrofluoric acid concentration between approximately 30 and 50% to determine its frequency change with time of etching characteristics, predetermining from said characteristics of said one crystal the time of etching for the others of said plurality of crystals necessary to bring each of said crystals to the desired frequency, and etching each of said crystals in said medium for its associated predetermined time, said etching being sufficient to change the frequency of the crystal being etched by at least .2%.

11. The method of producing high frequency quartz piezoelectric crystals, which comprises, finish lapping said crystals to a a frequency lower than that desired, thereafter increasing the frequency of said crystals by alternate etching operations with an aqueous hydrofluoric acid solution having a concentration between 10 and 60% by weight and lapping operations with a fine finishing abrasive, the final one of said operations being an etching operation, and controlling the time of said final etching operation to increase the frequency of said crystals by at least .05% and bring said crystals to the desired frequency.

JOHN M. WOLFSKILL.

REFERENCES CITED

The following references are of record in the file of this patent:

UNITED STATES PATENTS

| Number | Name | Date |
|---|---|---|
| 1,869,160 | Marrison | July 26, 1932 |
| 2,119,848 | Hawk | June 7, 1938 |
| 2,364,501 | Wolfskill | Dec. 5, 1944 |
| 2,376,219 | Winslow | May 15, 1945 |

FOREIGN PATENTS

| Number | Country | Date |
|---|---|---|
| 467,594 | Germany | Oct. 26, 1928 |